(12) United States Patent
Kaluskar et al.

(10) Patent No.: US 8,755,394 B2
(45) Date of Patent: Jun. 17, 2014

(54) GATEWAY DEVICE FOR PERFORMING COMMUNICATION WITH VARIOUS DEVICES IN HOME NETWORKS AND WIDE AREA NETWORKS

(75) Inventors: Pramod Balkrishna Kaluskar, Edison, NJ (US); Debajyoti Pal, Saratoga, CA (US)

(73) Assignee: Ikanos Communications, Inc., Fremont, CA (US)

( * ) Notice: Subject to any disclaimer, the term of this patent is extended or adjusted under 35 U.S.C. 154(b) by 329 days.

(21) Appl. No.: 13/102,623

(22) Filed: May 6, 2011

(65) Prior Publication Data

US 2011/0277001 A1    Nov. 10, 2011

Related U.S. Application Data

(60) Provisional application No. 61/331,847, filed on May 6, 2010.

(51) Int. Cl.
  *H04L 12/28* (2006.01)
(52) U.S. Cl.
  USPC ........... 370/401; 370/419; 370/235; 725/80; 725/78; 725/81
(58) Field of Classification Search
  USPC .......... 370/401, 235, 230; 709/206, 217, 218; 725/80, 82, 78, 120
  See application file for complete search history.

(56) References Cited

U.S. PATENT DOCUMENTS

| | | | | |
|---|---|---|---|---|
| 7,383,343 | B2* | 6/2008 | Mazzola | 709/228 |
| 7,478,416 | B2* | 1/2009 | Edson | 725/78 |
| 7,707,606 | B2* | 4/2010 | Hofrichter et al. | 725/50 |
| 7,949,792 | B2* | 5/2011 | Kujk et al. | 709/250 |
| 8,176,112 | B2* | 5/2012 | Hicks et al. | 709/200 |
| 8,311,863 | B1* | 11/2012 | Kemp | 705/7.11 |
| 2004/0210912 | A1* | 10/2004 | Jeronimo | 719/328 |
| 2005/0089052 | A1 | 4/2005 | Chen et al. | |
| 2008/0112320 | A1* | 5/2008 | van Willigenburg | 370/235 |
| 2008/0205419 | A1* | 8/2008 | Shin et al. | 370/401 |
| 2008/0279202 | A1* | 11/2008 | Choi et al. | 370/401 |
| 2008/0304500 | A1* | 12/2008 | Schliserman et al. | 370/401 |
| 2009/0036159 | A1 | 2/2009 | Chen et al. | |
| 2009/0178091 | A1* | 7/2009 | Miyamoto et al. | 725/91 |
| 2009/0259767 | A1 | 10/2009 | Karlsson et al. | |
| 2010/0071053 | A1* | 3/2010 | Ansari et al. | 726/12 |
| 2010/0262665 | A1* | 10/2010 | Ouyang et al. | 709/206 |
| 2012/0155449 | A1* | 6/2012 | Moeller et al. | 370/338 |

OTHER PUBLICATIONS

International Search Report issued Aug. 15, 2011 in corresponding PCT/US2011/35516.

* cited by examiner

*Primary Examiner* — Rasheed Gidado
(74) *Attorney, Agent, or Firm* — Pillsbury Winthrop Shaw Pittman LLP

(57) ABSTRACT

Disclosed are various embodiments for a gateway device that can execute applications which can communicate with various devices in one or more home networks as well as one or more wide area networks. The gateway device can possess capabilities to communicate over various types of proprietary and/or standardized networks. Additionally, the gateway device can be equipped with the ability to communicate with home devices that are directly coupled to the gateway device. The gateway device can also include a mass storage component that allows storage of data on behalf of applications executed therein.

30 Claims, 8 Drawing Sheets

GATEWAY DEVICE FOR PERFORMING COMMUNICATION WITH VARIOUS DEVICES IN HOME NETWORKS AND WIDE AREA NETWORKS

CROSS REFERENCE TO RELATED APPLICATION

This application claims the benefit of U.S. Provisional Application Ser. No. 61/331,847 entitled "Method and System to Configure and Manage Broadband-Enabled Digital Command and Control Systems," filed May 6, 2010, which is hereby incorporated herein by reference in its entirety.

BACKGROUND

Home networks can include various types of devices communicating over various types of network interfaces and protocols. For example, home appliances may communicate over a low-rate wireless personal area network based on the IEEE 802.15.4-2003 standard, while computing devices may communicate over an IEEE 802.3 (Ethernet) standard and/or IEEE 802.11 (wireless local area network) standard, and other devices, such as a television, can also receive data via a video interface. Efficient operation of these various devices can be improved by merging the data regarding operation of these devices with other devices and information that may be accessible from the home network.

SUMMARY OF THE INVENTION

Embodiments of the disclosure can include a system. The system can include a gateway device including a communication interface configured to communicate with at least one home device over a home network. The gateway device can also include a wide area network interface configured to communicate with at least one device over a wide area network. The gateway device can also include an application engine executed on the gateway device, the application engine configured to provide access to the communication interface and the wide area network interface, the application engine executing at least one application configured to communicate with at least one home device coupled to the gateway device via the home network.

Embodiments of the disclosure can also include a method. The method can include identifying, in a gateway device with at least one communication interface, at least one home device coupled to the at least one communication interface, the at least one communication interface configured to communicate with at least one home device over a home network. The method can also include identifying, in the gateway device with at least one wide area network interface, at least one wide area network coupled to the at least one wide area network interface. The method can also include executing, in the gateway device, an application engine configured to provide access to the communication interface and the wide area network interface, the application engine executing an application configured to communicate with at least one home device coupled to the gateway device via the home network.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure are directed to a gateway device that can facilitate communications between and among home devices as well as wide area networks, such as, for example, a network providing access to the Internet. In the context of this disclosure, a home device can include any device that can communicate via a network interface or some other interface with a gateway device according to embodiments of the invention. Embodiments of the disclosure can be equipped with a variety of communications interfaces that facilitate communication with home devices. First, a general description of one example of an environment in which an embodiment of the disclosure may operate is described.

Figure 1:
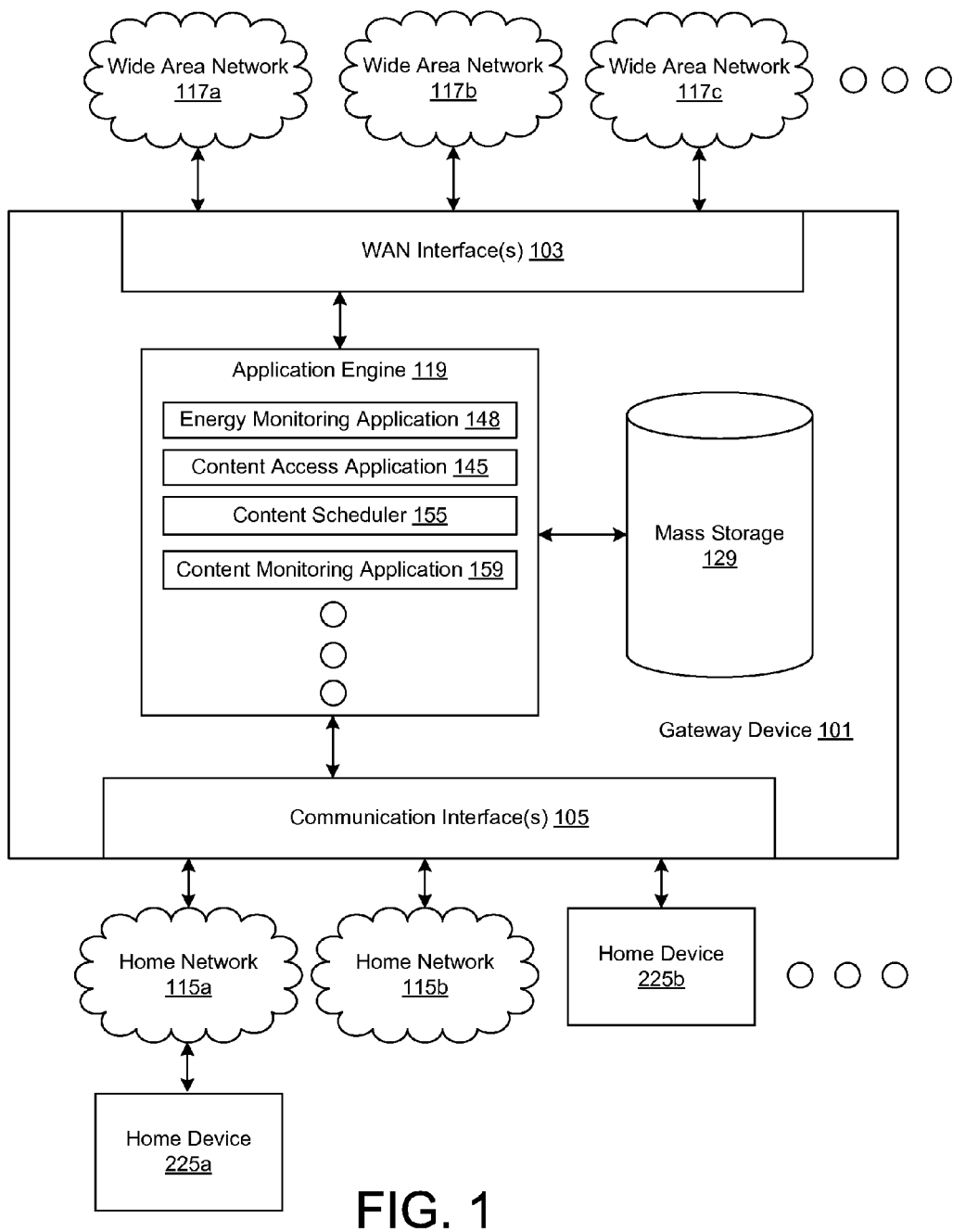
FIG. 1 is a drawing of a networked environment in which a gateway device can operate according to various embodiments of the present disclosure.

With reference to FIG. 1, shown is a networked environment 100 according to various embodiments. The networked environment 100 includes a gateway device 101 in communication with one or more networks. In the depicted example, the gateway device 101 is in communication with one or more home networks 115 as well as wide area networks 117. The gateway device 101 can also be in communication with one or more home devices 225. In one embodiment, a home device 225 can be connected to the gateway device 101 via a serial connection, a high definition multimedia interface (HDMI) connection, any other audio/video connections, or other data connections as can be appreciated. The gateway device 101 can also include a display device, such as an liquid crystal display (LCD) panel that can be integrated with the gateway device 101 that can display notifications or be used for configuring or otherwise interacting with the gateway device. Home devices 225 can be in communication with the gateway device 101 via a home network 115 and/or a wide area network 117. As one example, a home device can comprise a computing device, mobile device, or any device coupled to a local area network with which the gateway device 101 is connected. In the context of this disclosure, a home device 225 can include an device that can receive and/or transmit data to or from the gateway device 101 via a direct connection to the gateway device 101 and/or via a home network 115 to which the gateway device 101 is coupled.

Network traffic among and to home devices that may be directly coupled to the gateway device 101, a home network 115 and/or a wide area network 117 can be managed by the gateway device 101. In other words, network traffic destined for a home device 225 in communication with the gateway device 101 can be passed (e.g., routed, or bridged.) through the gateway device 101. In this way, applications executed within the gateway device 101 can act upon network traffic to and from home devices 225 as well as from devices communicating with the gateway device 101 via a wide area network 117.

Therefore, the gateway device 101 can be employed in a residential setting and act as a conduit between the various home networks 115, wide area networks 117, home devices 225, and other devices and/or users that may be in communication with the gateway device 101. The home networks 115 include, for example, a local area network (LAN), such as an Institute of Electrical and Electronics Engineers (IEEE) 802.3 (Ethernet) network, a wireless local area network, such as an IEEE 802.11a, 802.11b, 802.11g, 802.11n, etc., network. The home networks 115 can also include an IEEE 802.15.4-2003 low rate wireless or wired personal area network. The home networks 115 can also include a networking complying with International Telecommunication Union (ITU) G.9960, which is also known as a G.hn network. The home networks 115 can also include any of a variety of optical networks like GPON (G.984), EPON (IEEE 802.3), APON or BPON (G.983) etc (hereafter referred collectively as xPON) or any other standards based or proprietary network in which home devices 225 can communicate with the gateway device. In some embodiments, home networks 115 can be cascaded together with a bridging device, a routing device, or other similar device.

The wide area networks 117 can include for example, the Internet, intranets, extranets, private networks, wired networks, wireless networks, other suitable networks, etc., or any combination of two or more such networks. The wide area networks can include a network connection provided by an Internet service provider (ISP) that provides access to the Internet through various forms of service. For example, the wide area network 117 can include a digital subscriber line (DSL) connection that provides access to the Internet via and Internet service provider backbone. As another example, the wide area network 117 can include a Data Over Cable Service Interface Specification (DOCSIS) connection that provides access to the Internet via an Internet service provider backbone. As yet another example, the wide area network 117 can include an optical network connection like GPON (G.984), EPON (IEEE 802.3), APON or BPON (G.983) or similar, that provides access to the Internet via an Internet service provider backbone. A wide area network 117 can also include a wired network like Ethernet (IEEE 802.3) through which the Internet or other networks can be accessed. A wide area network 117 can also include a wireless network through which the Internet or other networks can be accessed. As some examples, such a wireless network can include a 3GPP Long Term Evolution (LTE) network, a Global System for Mobile Communications (GSM) data network, a Universal Mobile Telecommunications System (UTMS) data network, or other wireless networks as can be appreciated. A wide area network 117 can also include a connection to a telephone system (Pots), public switched telephone system (PSTN), voice-over-IP network (VoIP), Integrated Service Digital Network (ISDN) line, and other systems and protocols that support voice and data transmission.

Accordingly, the gateway device 101 can include one or more communications interfaces 105 to communicate with the various possible home networks 115 and/or home devices 225 to which the gateway device 101 can be paired. In one embodiment, the communications interfaces 105 can include hardware connections that implement a hardware connectivity standard specified by a particular networking or other communications, audio and/or video standard. For example, the gateway device 101 can include an HDMI connection to facilitate connectivity to a home device 225 such as a television. As another example, the gateway device 101 can include an Ethernet port to facilitate connection to a computing device, router, and/or switch implementing the 802.3 standard. As yet another example, the gateway device 101 can include a wireless chipset and/or antenna system that implements an 802.11 wireless networking standard. As yet another example, the gateway device 101 can include an optical chipset and/or system that implements any of the optical networking standards. A gateway device 101 operating system or other libraries or application programming interfaces (API) provided by the gateway device 101 can provide software level access to the various hardware communications standards supported by the gateway device 101. The hardware and software connectivity interfaces are referred to herein collectively as communications interfaces 105.

In some embodiments, a modem, signal decoder, or other device external to the gateway device 101 can facilitate access to a wide area network 117 and/or home network 115, and the gateway device 101 can communicate with such a device via another standard or proprietary network interface. For example, an external VDSL modem device can provide access to a VDSL wide area network, and allow the gateway device 101 or other devices access to the VDSL wide area network via Ethernet.

Similarly, the wide area network interfaces 103 can allow the gateway device 101 to communicate with the various possible wide area networks 117 and/or other remote devices to which the gateway device 101 can be paired. In one embodiment, the communications interfaces 105 can include hardware connections that implement a hardware connectivity standard specified by a particular networking or other communications, audio and/or video standard. For example, the wide area network interfaces can include an LTE radio and antenna system that facilitate connectivity with an LTE network. As another example, the wide area network interfaces 103 can include DSL modem hardware that facilitates connectivity with an Internet service provider network. A gateway device 101 operating system or other libraries or application programming interfaces (API) provided by the gateway device 101 can provide software level access to the various hardware communications standards supported by the gateway device 101. The hardware and software connectivity interfaces are referred to herein collectively as the communications interface 105.

The gateway device 101 can also include a mass storage 129 component. The mass storage 129 component can include any hard disk drive, solid state drive, flash memory, or other storage medium that can house data related to the gateway device 101. The mass storage 129 component can house content on behalf of computing devices on a home network 115, data related to home appliances communicating with the gateway device 101, wide area networks 117, routing tables associated with the routing of network traffic through the gateway device 101, and other data as can be appreciated. The mass storage 129 component can also be external to the gateway device 101 and accessible via a network connection, input/output interface. In some embodiments, the mass storage 129 can be resident on another computing device external to the gateway device 101.

Various applications and/or other functionality may be executed in the gateway device 101 according to various embodiments. The components executed on the gateway device 101, for example, include an application engine 119, which can execute one or more other applications that leverage the communications interfaces 105, the WAN interfaces 103, devices on the LAN and WAN interfaces, and/or the mass storage 129 resources of the gateway device 101 to provide various functionality in a variety of combinations, as will be described herein. The gateway device 101 may also execute other applications, services, processes, systems, engines, or functionality not discussed in detail herein. The application engine 119 is executed to provide a framework in which applications can access hardware services and/or resources of the gateway device 101 to communicate with one or more home devices coupled to a home network 115 and/or the gateway device 101 itself. Such an application can also access WANs to which the gateway device 101 is connected. Accordingly, various APIs can be provided through which applications can be authored for execution on the gateway device 101. For example, the gateway device 101 can provide a wide area connection API, which can allow an application executed in the gateway device 101 can access the Internet to communicate with other systems. As another example, the gateway device 101 can provide a home network API through which such an application can access home devices that may be coupled thereto.

The gateway device 101 can be in communication with one or more clients with which a user can interact. The gateway device 101 can provide an administrative user interface that allows a user on a client to access various configurations as well as access to operational parameters of the gateway device 101 and applications executed on the gateway device 101. For example, a user on a client can access such a user interface to query or modify gateway network settings, mass storage configurations, and other configurations. As another example, a user on a client can access such a user interface to modify a configuration of an application. To illustrate, an application that filters network traffic passed from the gateway device 101 to a home network 115 can allow a user to query and/or modify the content filtering settings via such a user interface. A client is representative of a one or more of devices that may be coupled to the gateway device 101, the wide area networks 117, and/or home networks 115. A client may comprise, for example, a processor-based system such as a computer device. Such a computer device may be embodied in the form of a desktop computer, a laptop computer, a personal digital assistant, a cellular telephone, set-top box, music players, web pads, tablet computer systems, game consoles, mobile devices, or other devices with like capability. A client may be used to configure, operate or query various aspects of the gateway or the home-device's operation. A client may also be configured to execute various applications such as a browser and/or other special purpose applications for the purpose of interacting with a user interface for the purpose of accessing content facilitated by the gateway device 101 or for the purpose of accessing a home device connected through the gateway device 101. Applications on the gateway may also cooperate to achieve a varying objectives. For example, a user may specify a target monthly-dollar-amount for ALL of the utilities combined. The application may be intelligent enough to determine limits that should then be set for water, gas, electricity, and other utilities. This could be done in a variety of ways, such as, for example, the application could look at past-usage data for these utilities and set limits, or it could use configured rules to determine the partitioning (e.g., no more than 50% of the monthly dollars should go to electricity etc).

Next, some non-limiting illustrative examples of applications that can be implemented in a gateway device 101 according to an embodiment of the disclosure are discussed. In one embodiment, an energy monitoring application 148 can be executed in the gateway device 101 that communicates with home devices such as home appliances that are in communication with the gateway device 101 via a home network 115. For example, home appliances can report energy usage information and other data with which an energy monitoring application 148 executed by the application engine 119 can make determinations regarding operational conditions of the appliance. The energy monitoring application 148 can also allow a user, via a client in communication with the gateway device 101 via a wide area network 117 and/or home network 115 to modify the operational state or condition of an appliance or other home device. An operational condition can include the various operational states in which a home appliance or other device can be placed. For example, a refrigerator in communication with the application may report its energy usage, internal temperature, water usage, and other data. A heating, ventilation, and air conditioning (HVAC) unit may report internal and/or external air temperatures, energy consumption, data from which energy consumption can be derived, and other data. Such application can also allow interaction with other home devices, such as, lighting systems, window covering systems, and other systems that can be monitored, controlled and/or actuated via a home network 115.

Accordingly, an energy monitoring application 148 can allow a user via a client in communication with the gateway device 101 via a home network 115 and/or wide area network 117 to modify the operational state of a home device. The gateway device 101 could generate a user interface that can be displayed on a client and that reports an operating state and operating data of various appliances and other devices communicating with the gateway device 101 via a home network 115. A user can modify an operational state of an appliance or device via such a user interface. Alternatively, the client could also execute a specialized application that "knows" about the device and can directly query/configure the device. For example, a user can cause a lighting system in a particular room to turn on and/or off by initiating a request from a client to the gateway device 101; the gateway would then query the lighting system to determine its state; if the lights were already in the desired state—it would respond to the user with that information; if the lights were not in the desired state, it would forward the request to the lighting system which would make the appropriate changes. As another example, a user can modify whether a window covering system, such as window blinds, shades, or other mechanically actuated that can communicate via a home network 115, are open or closed by initiating a request from a client that is forwarded by the gateway device. As yet another example, a user can modify a temperature setting associated with an HVAC system and/or refrigerator by initiating a request from a client that includes a temperature setting. The control function could also interact with the energy monitoring system, and notify the user that raising the temperature of the home (e.g., in winter) could lead to higher-than-configured expenses on gas for the current month (as configured in the energy monitoring system).

The energy monitoring system can also receive data about an energy pricing model that defines a particular energy price charged to a homeowner during a particular time of day, season, year, etc., where the varying prices are based at least upon user demand. Accordingly, the energy monitoring system can monitor usage of home devices such as appliances and other devices as well as modify the operational state of home devices to manage energy consumption in a way that reduces energy costs to the user. As one example, the energy monitoring application 148 can reduce an operational state of a clothes dryer (e.g., operating speed, temperature, etc.) during a high demand time of day when energy is priced higher relative to a low demand time of day. In this example, the gateway device 101 can reduce a spin speed of the dryer during a high priced period and increase the spin speed during a lower priced period. As another example, the energy monitoring application 148 can modify the operational state of an HVAC system (e.g., temperature, fan speed, etc.) based upon the pricing model of the current time of day.

As another example, the energy monitoring application 148 executed by gateway device 101 can communicate with an electric vehicle charging system that is configured to communicate via a home network 115. The application can detect when a vehicle is connected to the vehicle charging system and initiate vehicle charging during a low demand and/or low price-of-energy time of day, such as overnight. The energy monitoring application 148 can also allow utility usage among devices in a home and/or as tracked by a utility metering device to be tracked to within a specified threshold. If utility usage among devices connected to a home network 115 is within a specified threshold, the energy monitoring application 148 can modify the operational states of various home devices coupled to a home network 115. For example, if water usage as communicated to the gateway device 101 by a water metering device reflects that water usage within a billing period is approaching a specified threshold, the gateway device 101 can take various actions to conserve water usage in the home. As some examples, the energy monitoring application 148 can issue a command to a washing machine to enter a low water use mode until the next billing period commences.

As another example, if energy usage among home devices coupled to a home network 115 and/or as tracked by an electricity metering device reflects that energy usage within a home is approaching a threshold that can be specified by a user, then the gateway device 101 can similarly take actions to reduce energy consumption in the home. For example, the gateway device 101 can modify an operational state, such as a temperature setting, of an HVAC system. Additionally, an energy monitoring application 148 can also be configured to enforce an appliance utility usage quota for a specified time period. In one example, a user can, via a user interface on a client, set an energy usage quota for a particular appliance coupled to a home network 115. As another example, a user can set a time usage quota for a specified time period. To illustrate such a quota, a user can set a time usage quota for a television coupled to the gateway device 101, after which the device can be disabled. Such monitoring can also be done per device per time-of-day or can be done per-user, per-device, per time-of-day.

The energy monitoring application 148 can also receive data from utility metering devices (e.g., water, electricity, natural gas, fuel oil, Internet usage, telephone, etc.) that are in communication with a home network 115 and forward usage data to a computing system corresponding to a utility provider for usage monitoring and billing purposes.

Some service providers may require a secure communication channel to their monitoring devices (e,g, power/water/gas meters). Others may want to have the gateway collect this data on a more-frequent interval and simply obtain this data on a periodic basis. Still others may want to have the utility metering on a separate administrative interface. The applications running on the application engine can address these varying requirements.

In one embodiment, the application engine 119 can execute a content access application 145, which can manage access to content accessible to the gateway device 101. As one example, the content access application 145 can provide access via a home network 115 and/or wide area network 117 to content that is stored in the mass storage 129 of the gateway device 101. Content such as audio, video, or other content, can be hosted in the gateway device 101 mass storage 129 and accessed by a client in communication with the gateway device 101 via a wide area network 117. In such a scenario, the gateway device 101 can stream content requested by a client via a wide area network 117 and/or allow the client to download requested content from the gateway device 101. In one embodiment, a mobile device can communicate with the gateway device 101 via an LTE network, for example, and stream music or video content housed within the mass storage 129 or any other media library accessible to the gateway device 101.

The application engine 119 can also execute a content scheduler 155, which can executes requests on behalf of clients in a time-shifted fashion. In one example, the content scheduler 155, can receive a request from a client to retrieve content (e.g., a movie, software, or any other content), and subsequently schedule the retrieval of content from a content provider according to various parameters that can be configured by a user. In another example, the content scheduler 155 can retrieve the requested content from a content provider on behalf of the user during periods of low bandwidth consumption on a home network 115 and/or wide area network 117 by other home devices. In yet another example, the content scheduler 155 can retrieve the requested content on behalf of a user during an off-peak bandwidth usage time, which can be determined based upon an increased bandwidth usage billing that may be charged by an Internet service provider. An alternative way to determine an off-peak bandwidth usage period can include analyzing historical Internet usage by home devices coupled to a home network 115, and determining times of day in which less bandwidth is consumed, on average relative to other times of day. Accordingly, the content scheduler 155 can schedule a content download task during these off-peak periods of historical bandwidth usage. A content download task scheduled by the content scheduler 155 can download the requested content and store the content for later retrieval by a client in the gateway device 101 mass storage 129. Additionally, a client can remotely initiate request for the gateway device 101 to download content via a wide area network 117 via a user interface on the client. Accordingly, a content download task can be generated by the gateway device 101 that retrieves the requested content from a content provider via a wide area network 117 and stored in the gateway device 101 mass storage 129 for later retrieval from within a home network 115.

Additionally, various application executed by the application engine 119 can share data regarding home devices, tasks, and other data to optimize their operation. As one example, as referenced above, an application executed in the gateway device 101 can track historical Internet usage and determine whether usage on a particular home network 115 is reduced during a particular time window. Accordingly, an energy monitoring application 148 can issue a command to a router device or devices operating on the home networks 115 to operating in a reduced power consumption state or an off state during these time windows. Sharing of data between applications executed in the application engine 119 can be achieved through a suitable communication API between applications. Applications can be configured to store data in the gateway device mass storage 129 so it can be accessed even if the generating application is not active.

Another example of applications that can be executed in the application engine 119 in the gateway device 101 is illustrated by the content monitoring application 159. A content monitoring application 159 can facilitate content filtering, network traffic management, and other network management tasks. As noted above, network traffic originated by or destined for home devices can be passed through the gateway device 101. Accordingly, the content monitoring application 159 can be configured monitor network traffic associated with a home device and/or user to enforce the type of content that can be accessed by a given user, through a given device at a given time-of-day and/or time-of-month. In one embodiment, various usage quotas can be designated for the various users and/or home devices 225 coupled, and the content monitoring application 159 can identify whether network traffic is associated with a user and/or a home device 225. The content monitoring application 159 can track usage data during a specified time period (e.g., day, week, month, etc.), and generate a notification transmitted to one of a designated client, the user and/or the home device 225 if a usage quota is approached and/or exceeded. In some embodiments, the gateway device 101 can reject and/or throttle additional network traffic associated with the user and/or home device 225 when a bandwidth usage quota is exceeded. Additionally, the content monitoring application 159 can allow monitor type of content in traffic that is internal to a home network 115 and/or that traverses the gateway device 101 to/from a wide area network 117.

The content monitoring application 159 can also filter network traffic based at least upon the content contained therein. For example, a user can set up parental controls for certain devices and/or users on a home network 115, which the content monitoring application 159 can enforce. In one embodiment, the content monitoring application 159 can reject requests to access content from a site via a wide area network 117 that are on a banned content list that can be configured by a user. In other words, the content monitoring application 159 can be configured by a user with various restrictions as well as a corresponding action to be taken upon identifying the restriction.

Another example of an application that could execute on the application engine 119 is Virus Protection. A virus monitoring application scans network traffic that is passed between a wide area network 117 and home area network 115 looking for virus-infected traffic. If it finds such traffic, it can take a corresponding action, such as disconnecting that traffic stream, notifying a designated client or user as per its configuration.

Other applications aside from those illustrated in the depicted example can be executed by the application engine 119. As an additional example, a virtual private network (VPN) tunnel application can be executed by the gateway device 101. Such an application can, for example, establish an encrypted or secure tunnel to a third party site that is accessible via a wide area network 117. Accordingly, network traffic from a home device and/or the gateway device 101 that is destined for such a site can be passed through the secure tunnel.

As another example of an application that can be executed by the application engine 119, a network service level agreement (SLA) application establish and/or enforce an SLA that is associated with network traffic among one or more home networks 115 or between home networks 115 and a wide area network 117. As one example, the gateway device 101 can determine a type of traffic that is requested by a home device 225 and allocate a set of traffic parameters (e.g., bandwidth, jitter, latency, etc.) with the network traffic. The network SLA application can identify a home device 225 and/or a type of network traffic as voice traffic associated with a telephone service. Accordingly, the network SLA application can enforce the traffic parameters for voice traffic that is passed through the gateway device 101. As another example, the gateway device 101 can identify certain network traffic as a video stream, and associate a set of traffic parameters appropriate for delivery of the video stream to a home device 225. If the network SLA application is unable to allocate the necessary resources to meet the desired SLA, it can generate a notification that can be transmitted to a designated client and/or to the home device 225 associated with the type of traffic that can inform a user that an SLA cannot be enforced within the home network 115 to which the home device 225 is coupled. Alternatively, and if configured to do so, it can prioritize one kind of traffic over another kind of traffic (e.g., prioritize voice traffic over data). As another example, a request from a client via a wide area network 117 can comprise a request to stream content from a home device 225 (e.g., outbound streaming). Accordingly, the network SLA application can identify a type of traffic associated with outbound traffic and enforce the traffic parameters if network resources are available. In other words, the network SLA application can identify and enforce traffic parameters on an ingress and/or egress interface, which can be any of the home networks 115 and/or wide area networks 117.

Figure 2:
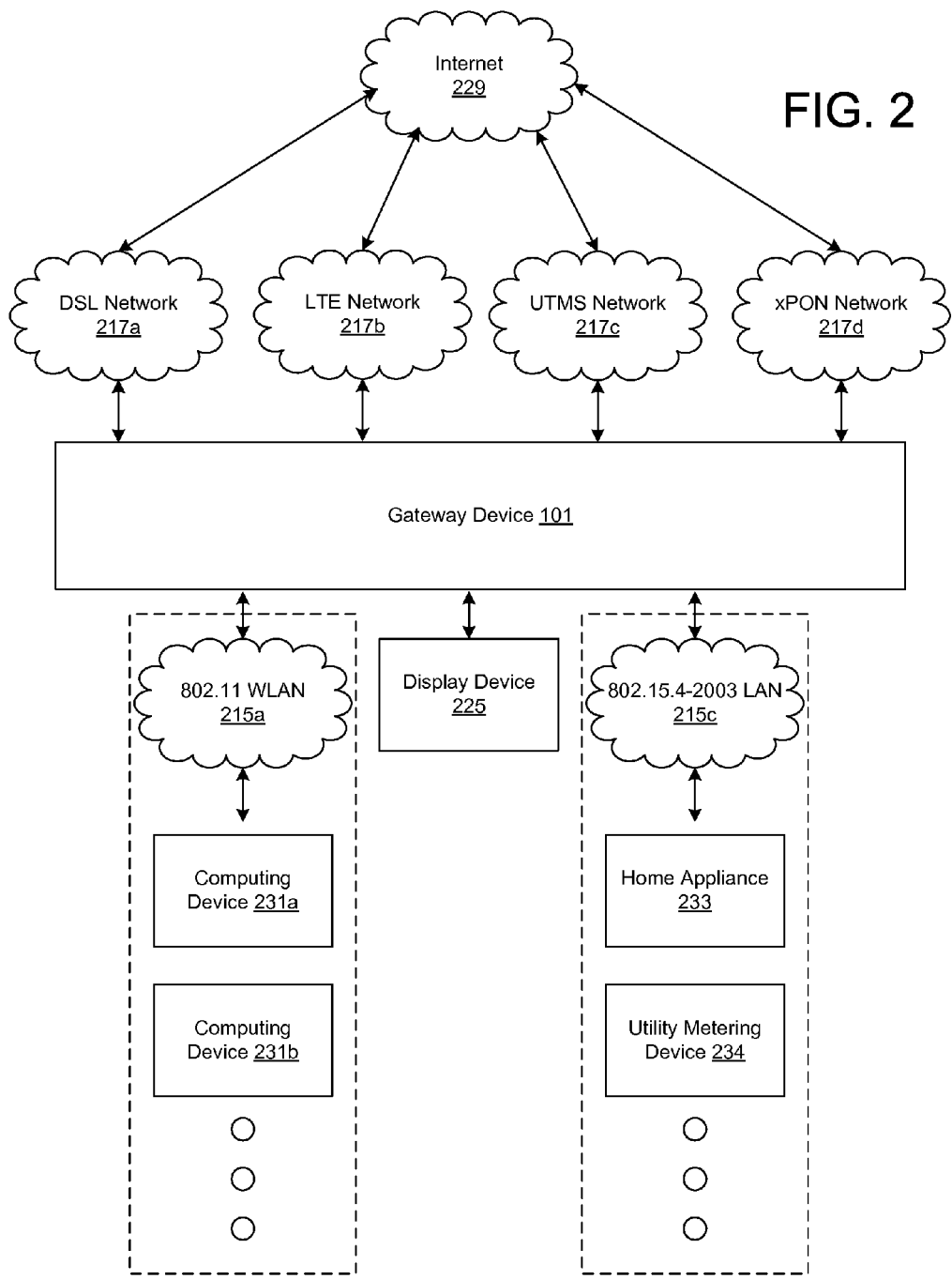
FIGS. 2-5 are drawings of example implementations of environments in which a gateway device can be implemented according to various embodiments of the present disclosure.

Referring next to FIG. 2, shown is one example of an arrangement of a gateway device 101 as well as various local area networks 115 and/or wide area networks 117 of any standard or proprietary nature. In the depicted example, the gateway device 101 can be coupled to an 802.11 wireless local area network (WLAN) 215a, which is a home network. Additionally, various computing devices 231 can be in communication with the gateway device 101 as well as other computing devices 231 via the 802.11 WLAN 215a. The depicted gateway device 101 is also in communication with a display device 225. In one embodiment, such a display device 225 can receive video content, notifications, or other data from the gateway device 101. The gateway device 101 is also coupled to a low-rate personal area network with which home appliances can communicate with the gateway device 101. The gateway device can also be coupled to an 802.15.4-2003 network as well as various home appliances 233, utility metering devices 234, or other devices that can communicate via such a network. In the depicted example, the gateway device 101 is also coupled to various wide area networks 117. In the non-limiting illustration, the gateway device 101 is coupled to a VDSL network 217a, an LTE network 217b, a UTMS network 217c, and a xPON network 217d. In some embodiments, the wide area networks 117 can provide access to the Internet 229 or other public and/or private networks.

Figure 3A:
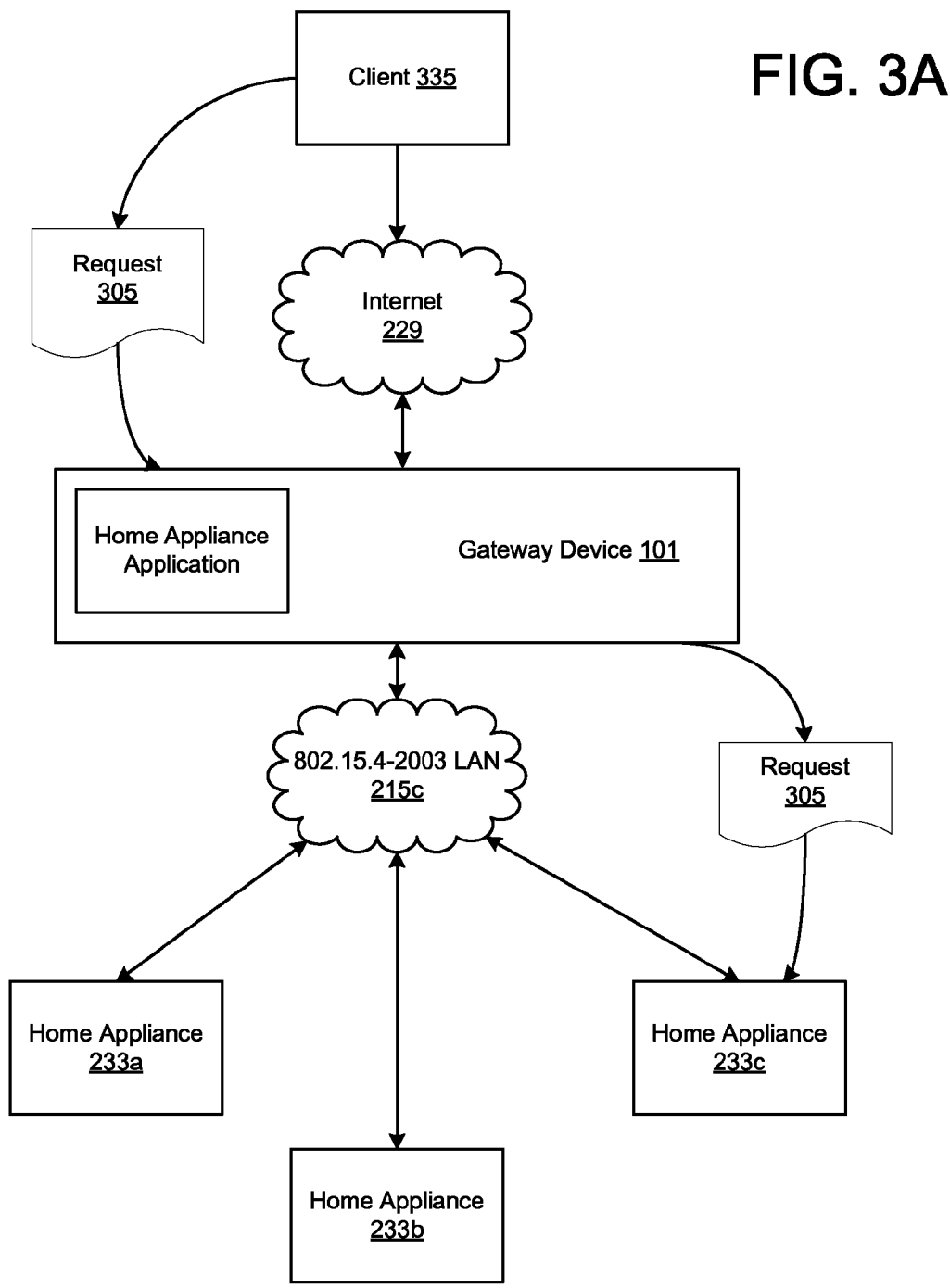

Turning now to FIG. 3A, shown is one illustration that depicts an operation of the gateway device 101 as well as an application executed thereon. In the depicted example, a home appliance application can receive a request 305 from a mobile device 335 via the Internet 229 to change an operating state of a home appliance 233 coupled to a home network such as an 802.15.4-2003 LAN 215c. Accordingly, the home appliance application can pass such a request in a format that can be processed by the designated home appliance 233c.

Turning now to FIG. 3A, shown is one illustration that depicts an operation of the gateway device 101 as well as an application executed thereon. In the depicted example, a home appliance application can receive a request 305 from a client 335 via the Internet 229 to change an operating state of a home appliance 233 coupled to a home network such as an 802.15.4-2003 LAN 215c. Accordingly, the home appliance application can pass such a request in a format that can be processed by the designated home appliance 233c.

Figure 3B:
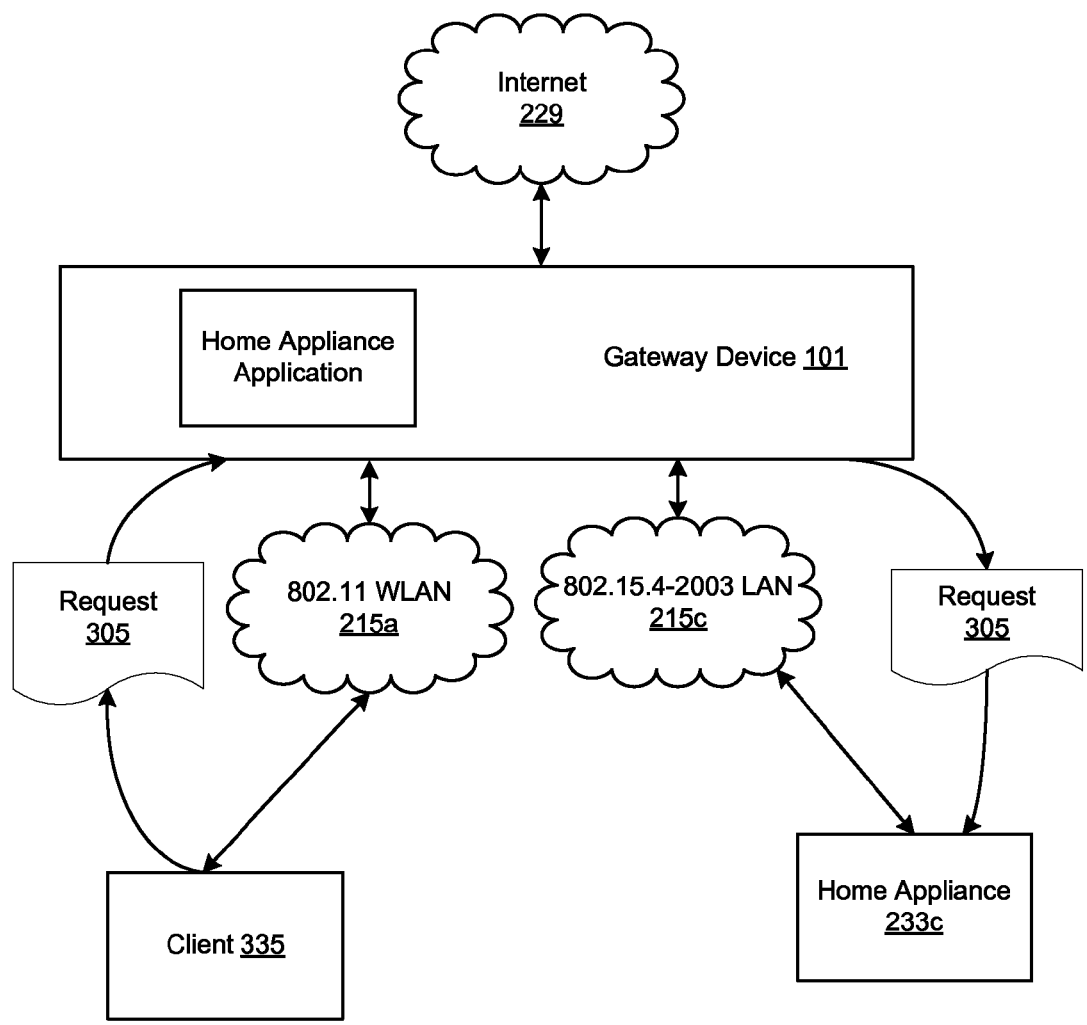

FIG. 3B continues the example of FIG. 3A, as it illustrates a home appliance application can receive a request 305 from a client 335 via a home network 215a to change an operating state of a home appliance 233 coupled to a home network such as an 802.15.4-2003 LAN 215c. In the depicted example, the request 305 is received via a WLAN. Accordingly, the home appliance application can pass such a request in a format that can be processed by the designated home appliance 233c.

Figure 4:
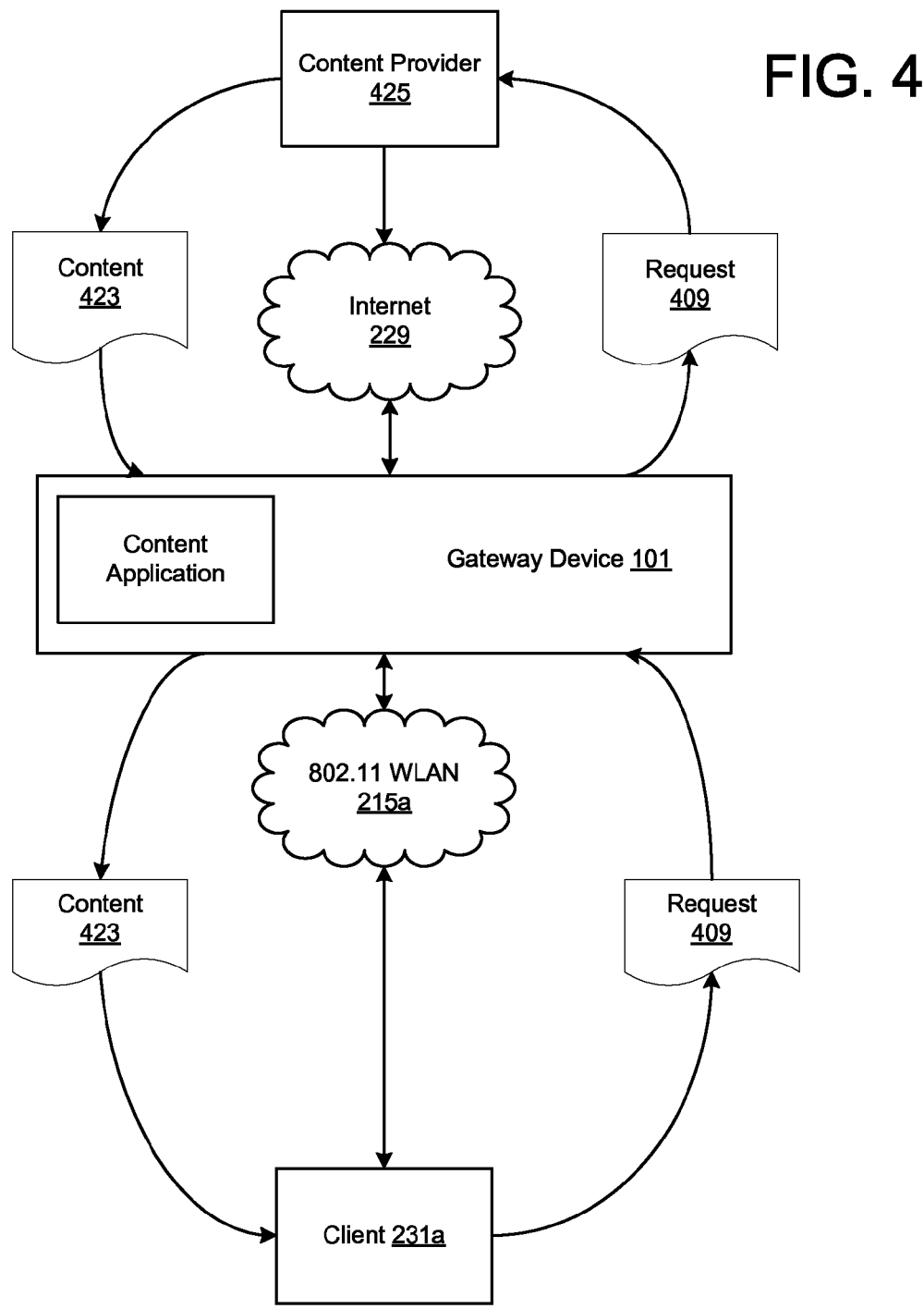

Moving on to FIG. 4, shown is another illustration of an operation of a gateway device 101 as well as another application executed thereon. In the depicted example, a computing device 231a coupled to an 802.11 WLAN 215a can generate a request 409 for content from a content provider 425. Accordingly, the request is passed through the gateway device 101 and forwarded to the content provider 425, which can respond with the requested content 423, which is likewise passed through the gateway device 101 and on to the requesting computing device 231a.

Figure 5:
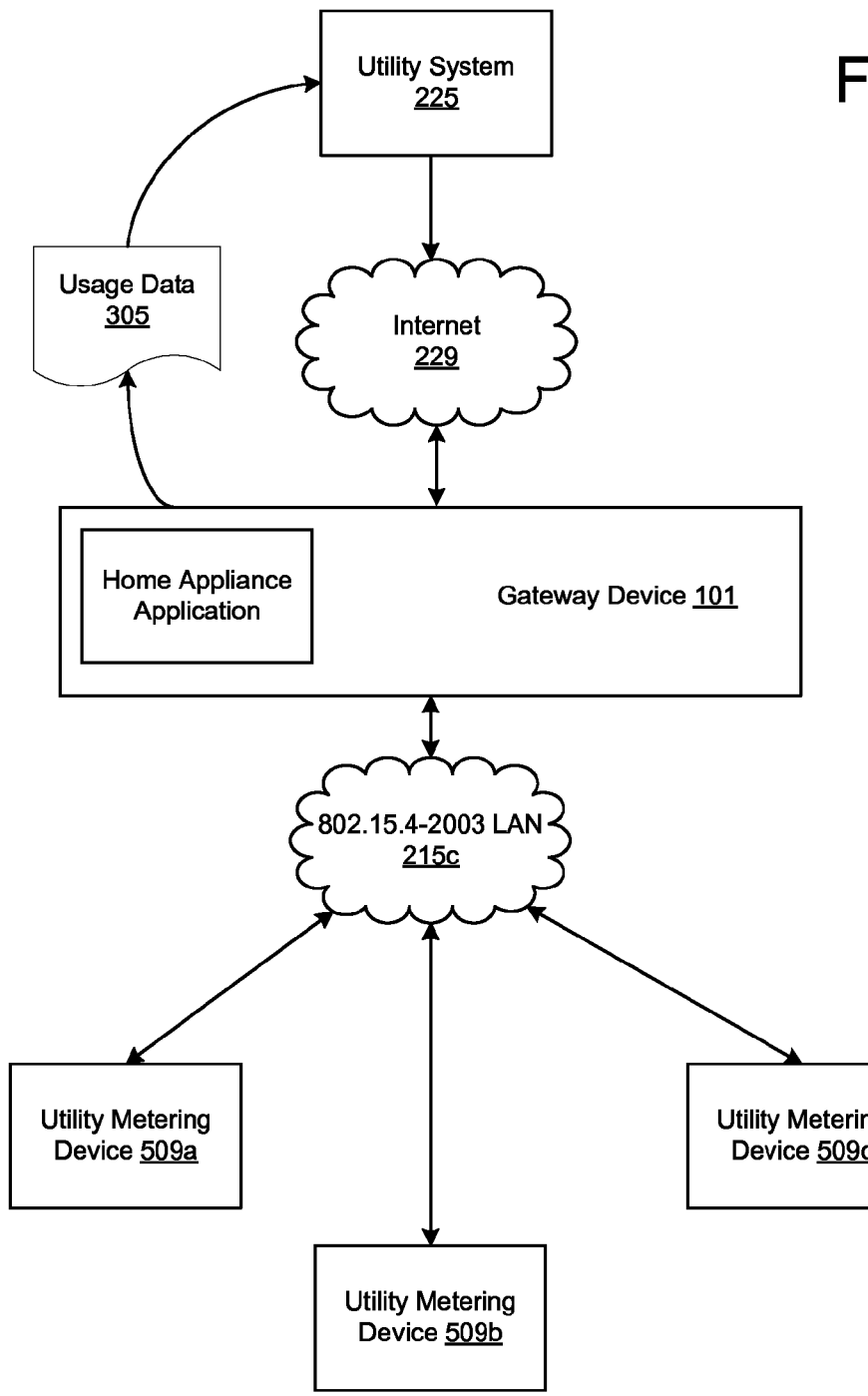

Next, FIG. 5 depicts another alternative example of an example of an application that can be executed in the gateway device 101 according to an embodiment of the disclosure. In the depicted non-limiting example, a home appliance application executed in the gateway device 101 can receive utility usage data from one or more utility metering devices 509, and forward usage data 305 to a utility system 225 for usage monitoring and/or billing purposes. It should be appreciated that the examples shown in FIGS. 1-5 are merely illustrative of applications and functionality that can be implemented in a gateway device 101 according to embodiments of the disclosure. A gateway device 101 can execute one or more such application simultaneously, and may also execute other application that leverage its capabilities that are not shown or described.

Figure 6:
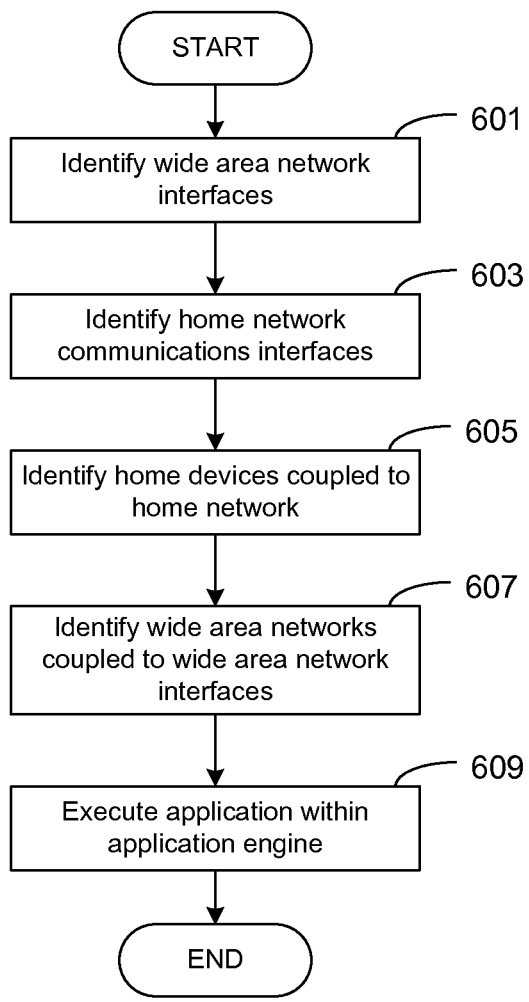
FIG. 6 is a flowchart illustrating one example of functionality implemented as portions of application engine executed in a gateway device according to various embodiments of the present disclosure.

Referring next to FIG. 6, shown is a flowchart that provides one example of the operation of a portion of the application engine 119 according to various embodiments. It is understood that the flowchart of FIG. 6 provides merely an example of the many different types of functional arrangements that may be employed to implement the operation of the portion of the application engine 119 as described herein. As an alternative, the flowchart of FIG. 6 may be viewed as depicting an example of steps of a method implemented in the gateway device 101 (FIG. 1) according to one or more embodiments.

First in box 601, the application engine 119 can identify any wide area network interfaces in the gateway device 101. In box 603, the application engine 119 can identify any local area network interfaces in the gateway device 101. Next, in box 605, the application engine 119 can identify home devices that are coupled to any of any home networks and/or directly coupled to the gateway device. In box 607, the application engine 119 can identify wide area networks that are coupled to the wide area network interfaces. In box 609, once the application engine 119 has identified the various home devices and networks to which it is connected, an application can be executed that can communicate with one or more of these networks and/or devices.

Figure 7:
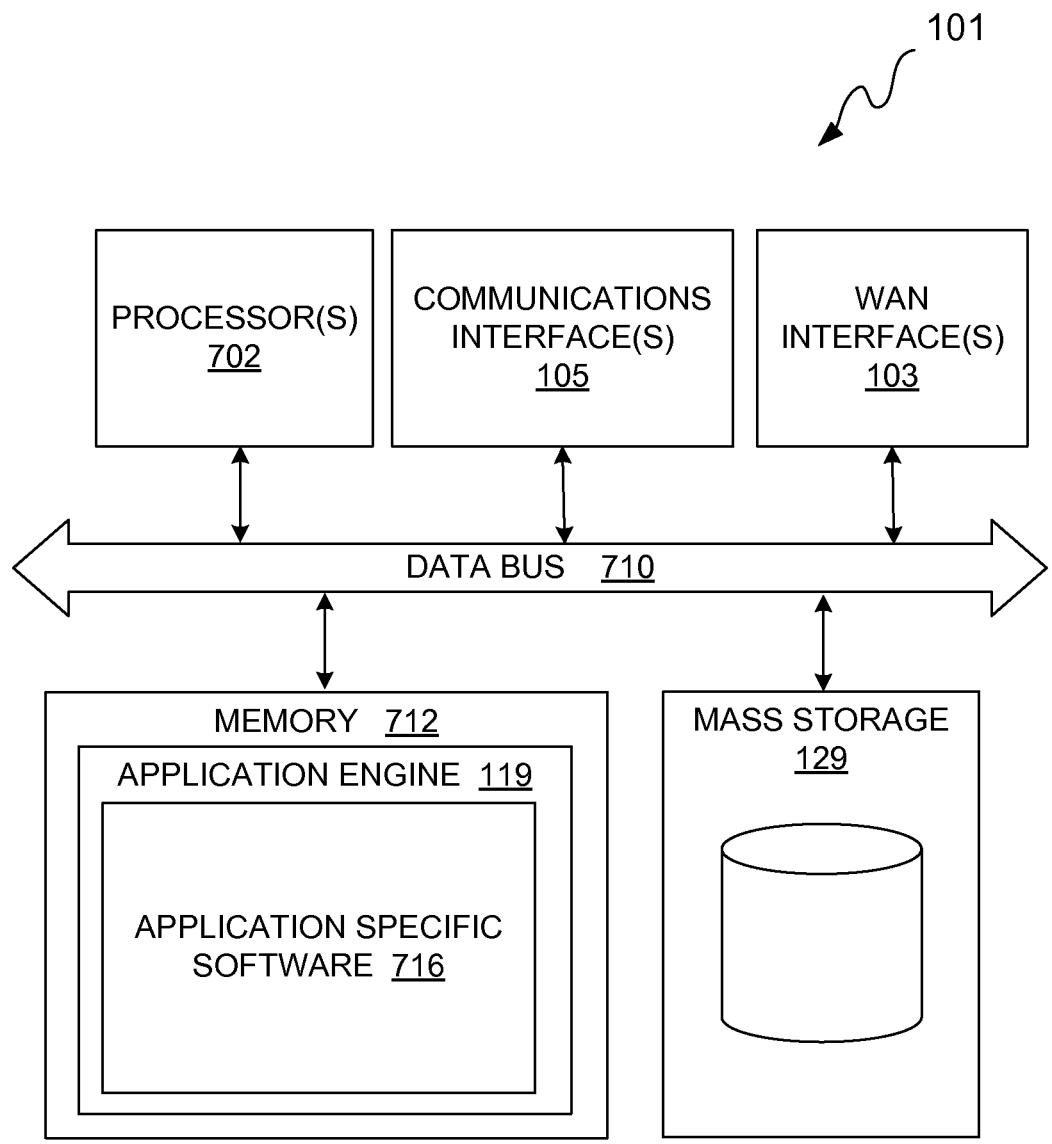
FIG. 7 is a schematic block diagram that provides one example illustration of a gateway device according to various embodiments of the present disclosure.

FIG. 7 illustrates an embodiment of an apparatus for implementing, for example, the functionality of a gateway device 101 as shown in FIG. 1. Generally speaking, the various embodiments for executing an application engine 119 may be implemented in any one of a number of computing devices. Irrespective of its specific arrangement, the gateway device 101 in FIG. 7 may comprise memory 712, a processor 702, and mass storage 129, wherein each of these devices are connected across a data bus 710.

The processor 702 may include one or more custom made or commercially available processor, a central processing unit (CPU) or an auxiliary processor, a semiconductor based microprocessor (in the form of a microchip), one or more application specific integrated circuits (ASICs), one or more field programmable gate arrays (FPGAs), a plurality of suitably configured digital logic gates, and other well known electrical configurations comprising discrete elements both individually and in various combinations to coordinate the overall operation of the computing system. Additionally, the processor 702 can include one or more coprocessors than can facilitate processing of network traffic, video processing, or perform other computational tasks that an application executed by the application engine 119 can leverage.

The memory 712 can include any one or a combination of volatile memory elements (e.g., random-access memory (RAM, such as DRAM, and SRAM, etc.)) and nonvolatile memory elements (e.g., ROM, hard drive, CDROM, etc.). The memory 712 typically comprises a native operating system, one or more native applications, emulation systems, or emulated applications for any of a variety of operating systems and/or emulated hardware platforms, emulated operating systems, etc. The application engine 119 can be executed by the gateway device, and application specific software 716 (e.g., applications) stored on a computer readable medium and executed by the processor 702 and may include any of the components described with respect to FIG. 1. One of ordinary skill in the art will appreciate that the memory 712 can, and typically will, comprise other components which have been omitted for purposes of brevity. It should be noted, however, that the various components in FIG. 1 may also be embodied as hardware.

The gateway device 101 can also include a mass storage 129 component that applications can employ for data storage and retrieval. The mass storage 129 component can include one or more hard disk drives, solid state drives, flash memory, or other storage medium as can be appreciated. The gateway device 101 also includes one or more communications interface 105 that is configured to allow communication with a home network and/or a home device that is coupled directly to the gateway device 101. In one embodiment, the communications interfaces 105 can comprise a "high-speed plug-n-play" architecture that is a flexible interconnect. The communications interfaces 105 can include a conventional hot-plug interface (e.g., like USB2/3), a cold-plug interface (e.g., PCIe) and/or a manufacturing-time interface (e.g., xGMII, POS2, or any proprietary interface). Similarly, the gateway device 101 includes one or more WAN interface 103 that facilitate communication with one or more wide area networks. As noted above, the WAN interfaces 103 can include hardware and software components that facilitate communication over various wide area network standards.

Where any of the components described above comprises software or code, these components are embodied in a non-transitory computer-readable medium for use by or in connection with an instruction execution system such as, for example, a processor in a computer system or other system. In the context of the present disclosure, a computer-readable medium refers to any tangible medium that can contain, store, or maintain the software or code for use by or in connection with an instruction execution system. For example, a computer-readable medium may store one or more programs for execution by the processing device 502 described above.

More specific examples of the computer-readable medium may include a portable computer diskette, a random access memory (RAM), a read-only memory (ROM), an erasable programmable read-only memory (EPROM, EEPROM, or Flash memory), and a portable compact disc read-only memory (CDROM). As shown in FIG. 6, the gateway device 101 may further comprise mass storage 129. For some embodiments, the mass storage 129 may include a database for storing and managing data, such as bit-loading tables, a standardized or proprietary file system, or any other storage scheme. In some embodiments, the mass storage 129 component can be coupled to the gateway device 101 via an input/output interface. In this regard, the mass storage 129 can include a universal serial bus (USB) device, a serial advanced technology attachment (SATA) device, or other type of device connectivity standard.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application engine 119 or others, that comprises software or code can be embodied in any non-transitory computer-readable medium for use by or in connection with an instruction execution system such as, for example, a processor 702 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Some embodiments may exclude software and machine enabled techniques, methods, business models, architectures, and technology relating to elements and systems (such elements and systems to include associated web-based front-end bandwidth and content brokerage systems, associated application development kits, related native application, and affiliated back-end registries and billing systems) that enable self-monitoring Internet applications (Android, webOS, Symbian, etc.) to reside on a consumer device (cell phone, computer, modem device, home gateway, or analogous consumer embedded system) and self-monitor their own bandwidth consumption and commercially related activities for the purpose of using such monitored data for redirecting associated Internet access changes and/or credits, as well as other commercially related charges and/or credits from any one or more of the application user, application creator, content provider, or bandwidth provider to any one or more of the application user, application creator, content provider, or bandwidth provider as the case may be, whether that redirection is for the purpose of cross-subsidy, revenue sharing, strategic collaboration, or otherwise as amongst any one or more of the application user, application creator, content provider, or bandwidth provider.

Therefore, the following is claimed:

1. A gateway device, comprising:
one or more processors,
a communication interface configured to communicate with at least one home device over a home network, the communication interface comprising at least one of: a serial port interface, a wireless networking interface, a wired networking interface, an audio interface, and a video interface;
a wide area network interface configured to communicate with at least one wide area network, the wide area network interface comprising at least one of: a serial port interface, a wireless networking interface, and a wired networking interface, wherein traffic from the at least one wide area network is passed to the home network via the gateway device;
an application engine executed by the one or more processors on the gateway device, the application engine configured to provide access to the communication interface and the wide area network interface, the application engine executing at least one application configured to communicate with at least one home device coupled to the gateway device via the home network, wherein one of the at least one home device comprises a home appliance, the at least one application comprising:
logic that receives a request from a user interface rendered in at least one of a display device coupled to the gateway device, a browser or a mobile device, the request associated with modifying an operating condition of the home appliance;
logic that generates a command to modify the operating condition of the home appliance;
logic that communicates the command to the home appliance via the communications interface over the home network;
logic that receives a request from a first client device to access at least one media source in a media library accessible to the gateway device;
logic that streams the at least one media source to the client device via the wide area network interface over the wide area network;
logic that streams the at least one media source to the first client device via at least one the local area network;

logic that determines whether a utility usage metric tracked by the utility metering device is within a usage threshold;

logic that issues a command via the home network to the home appliance to alter an operating state of the home appliance to a first operating state, the first operating state changing consumption of a utility tracked by the utility metering device;

logic that receives a request to download content on behalf of at least one computing device;

logic that schedules a task offload on behalf of the at least one computing device;

logic that determines whether a current time reflects a peak bandwidth time;

logic that schedules the content download task during an off peak bandwidth time;

logic that identifies a type of network traffic received by the gateway device designated for at least one home device; and logic that allocates a percentage of at least one of wide area network bandwidth and home network bandwidth for the type of network traffic designated for the one of the at least one home device.

2. A gateway device configured to communicate with at least one home device, comprising:

one or more processors, a communication interface configured to communicate with the at least one home device over a home network, wherein one of the at least one home device comprises a home appliance;

a wide area network interface configured to communicate with the at least one home device over a wide area network; and an application engine executed by the one or more processors on the gateway device, the application engine configured to provide access to the communication interface and the wide area network interface, the application engine executing at least one application configured to communicate with the at least one home device coupled to the gateway device via the home network, wherein the at least one application comprises:

logic that receives a request associated with modifying an operating condition of the home appliance;

logic that generates a command to modify the operating condition of the home appliance; and logic that communicates the command to the home appliance via the communications interface over the home network, wherein gateway device is in communication with a media library, and the application further comprises:

logic that receives a request from a client to synchronize a mobile device media library with the media library; and logic that transfers at least a portion of the media library that is not stored on the client via at least one of the wide area network interface and the home network interface logic that transfers at least a portion of the media library that is not stored on the client via the at least one of the home network and the wide area network.

3. The gateway device of claim 2, wherein the communication interface further comprises at least one of: a serial port interface, a wireless networking interface, a wired networking interface, an audio interface, and a video interface.

4. The gateway device of claim 2, wherein the wide area network interface further comprises at least one of: a serial port interface, a wireless networking interface, a wired networking interface.

5. The gateway device of claim 2, wherein the application further comprises:

logic that tracks a historical usage pattern associated with the at least one home device during a specified time period;

logic that determines whether the historical usage pattern reflects that the at least one home device is active less often than a threshold during a current time; and logic that deactivates the at least one home device until the current time reflects a time at which the historical usage pattern reflects that the at least one home device is active more often than the threshold.

6. The gateway device of claim 5, wherein the application further comprises:

logic that activates the at least one home device when the current time reflects a time at which the historical usage pattern reflects that the at least one home device is active more often than the threshold.

7. The gateway device of claim 2, wherein the request is from a user interface rendered in at least one of a display coupled to the gateway device, a browser and a client.

8. The gateway device of claim 2, wherein the home appliance is a window covering, and the command is a command to cause at least one of opening, closing and changing a setting associated with the window covering.

9. The gateway device of claim 2, wherein the home appliance is at least one of a dishwasher, clothes washer, clothes dryer, an HVAC unit, and at least one lighting system, and the command is a command the causes a change in the state of the home appliance.

10. The gateway device of claim 2, wherein the application further comprises:

logic that determines whether a current time of day corresponds to a first energy pricing model that includes an energy price that is greater than a second energy pricing model that corresponds to another time of day; and logic that sends a command to the home appliance via the communications interface over the home network to change the operational condition of the home appliance to a first condition that consumes less energy than a second condition when the current time of day corresponds to the first energy pricing model.

11. The gateway device of claim 10, wherein the application further comprises logic that sends a command to the home appliance via the communications interface over the home network to change the operational condition of the home appliance to the second condition when the current time of day corresponds to the second energy pricing model.

12. The gateway device of claim 10, wherein the application is configured to retrieve the first energy pricing model and the second energy pricing model from a utility system via the wide area network.

13. The gateway device of claim 2, wherein the gateway device is in communication with a client, and the application further comprises:

logic that receives a request from the client to access at least one media source in a media library; and logic that streams the at least one media source to the client via the wide area network interface over the wide area network.

14. The gateway device of claim 2, wherein one of the at least one home device is a utility metering device, and the application further comprises:

logic that determines whether a utility usage metric tracked by the utility metering device is within a threshold percentage of a usage threshold; and logic that issues a command via the home network to the home appliance to alter an operating state of the home appliance to a first operating state, the first operating state reducing consumption of a utility tracked by the utility metering device.

15. The gateway device of claim 2, wherein network traffic between the home network to the wide area network is passed through the gateway device, one of the at least one home device is a device that consumes wide area network bandwidth, and the application further comprises:
logic that generates a notification when the wide area network bandwidth consumed by the device during a specified time period exceeds a predefined threshold.

16. The gateway device of claim 2, wherein network traffic from the home network to the wide area network passes through the gateway device, one of the at least one home device comprise at least one bandwidth consuming device that consumes wide area network bandwidth, and the application further comprises:
logic that associates a respective user with traffic passed through the gateway device;
logic that determines whether traffic during a specified time period associated with the respective user exceeds a bandwidth usage quota associated with the respective user; and
logic that performs at least one of generating of a notification, bandwidth throttling and rejection of traffic associated with the respective user when the traffic during the specified time period exceeds the bandwidth usage quota.

17. The gateway device of claim 2, wherein network traffic from the home network to the wide area network passes through the gateway device, one of the at least one home device comprise at least one computing device that accesses content via the wide area network, and the application further comprises:
logic that associates the one of the home device with traffic passed via the gateway device;
logic that determines whether traffic during a specified time period associated with the home device exceeds a bandwidth usage quota associated with the home device; and
logic that performs at least one of generating of a notification, bandwidth throttling and rejection of traffic associated with the home device when the traffic during the specified time period exceeds the bandwidth usage quota.

18. The gateway device of claim 2, wherein network traffic from the home network to the wide area network passes through the gateway device, one of the at least one home device comprise at least one computing device that accesses content via the wide area network, and the application further comprises:
logic that associates a home device with traffic passed via the gateway device; and
logic that associates a user with traffic passed via the gateway device; and
logic that determines whether a type of traffic meets one of the configured types of traffic; and
logic that determines said traffic occurs during a specified time period
logic that performs at least one of generating of a notification, bandwidth throttling and rejection of traffic associated with the home device when the traffic during the specified time period exceeds the bandwidth usage quota.

19. The gateway device of claim 2, wherein the application further comprises:
logic that receives a request from a client to initiate an offload task on behalf of the client; and
logic that schedules an offload task on behalf of the client.

20. The gateway device of claim 19, wherein network traffic from the home network to the wide area network passes through the gateway device and the application further comprises:
logic that receives a request to download content on behalf of the at least one home device; and
logic that schedules a content download task on behalf of the at least one computing device.

21. The gateway device of claim 20, wherein the request to download content is received from a second computing device via the wide area network.

22. The gateway device of claim 20, wherein the application further comprises:
logic that determines whether a current time reflects a peak bandwidth time; and
logic that schedules the content download task during an off peak bandwidth time.

23. The gateway device of claim 20, wherein the application further comprises:
logic that determines whether an amount of traffic on the home network exceeds a threshold; and
logic that initiates the content download task when the amount of traffic on the home network is below the threshold.

24. A method, comprising the steps of:
identifying, in a gateway device with at least one communication interface, at least one home device coupled to the at least one communication interface, the at least one communication interface configured to communicate with the at least one home device over a home network;
identifying, in the gateway device with at least one wide area network interface, at least one wide area network coupled to the at least one wide area network interface;
executing, in the gateway device, an application engine configured to provide access to the communication interface and the wide area network interface, the application engine executing an application configured to communicate with the at least one home device coupled to the gateway device via the home network;
receiving, in the gateway device, a request associated with modifying an operating condition of one of the at least one home device;
generating, in the gateway device, a command to modify the operating condition of the one of the at least one home device; and
communicating the command to the one of the at least one home device via the communications interface over the home network,
wherein network traffic from the home network to the wide area network is passed through the gateway device, one of the at least one home device comprises at least one computing device that accesses content via the wide area network, and the method further comprises:
examining, in the gateway device, network traffic from the wide area network via the wide area network interface that is destined for the at least one computing device; and
determining, in the gateway device, whether the network traffic meets a restriction specified by a configuration; and taking an action specified by the configuration,
wherein the restriction comprises network traffic that is virus infected, and the action comprises at least one of: retrieval of at least one anti-virus specification, applying the at least one anti-virus specification to clean the virus infected network traffic, and passing the disinfected network traffic, and possibly the virus infected network traffic when an anti-virus specification is unavailable.

25. The method of claim 24, wherein the method further comprises:
   establishing, in the gateway device, an encrypted communications link to a third party site via the wide area network interface over the wide area network; and
   passing, in the gateway device, network traffic between the at least one computing device in home network and the third party site via the encrypted communications link.

26. The method of claim 24, wherein the method further comprises:
   identifying, in the gateway device, a type of network traffic received by the gateway device designated for at least one of one of the at least one home device and a client;
   associating, in the gateway device, a set of traffic parameters with the at least one of wide area network interface and home network interface for the type of network traffic designated for one of the at least one home device and a client; and
   scheduling, in the gateway device, the type of network traffic according to the set of traffic parameters.

27. The method of claim 26, wherein the set of traffic parameters further comprise at least one of: a bandwidth parameter, a latency parameter, a priority parameter, and a jitter parameter.

28. The method of claim 26, further comprising the steps of:
   determining, in the gateway device, whether the type of traffic parameters required by the input stream are available in the outgoing network; and
   notifying, via the gateway device, the one of one of the at least one home device and a client when sufficient resources are not available.

29. The method of claim 24, wherein the method further comprises:
   receiving, in the gateway device, a request to access content;
   determining, in the gateway device, a set of traffic parameters required on at least one of the home network and the wide area network to comply with the request based at least upon a type of network traffic; and
   allocating, in the gateway device, the set of traffic parameters to comply with the request on an egress interface, the egress interface being one of the at least one home network and the at least one wide area network.

30. The method of claim 29, wherein the step of allocating a set of traffic parameters is further based at least upon a classification of the type of network traffic, the classification being at least one of: voice, video, video-conferencing, and prioritized data.

* * * * *

UNITED STATES PATENT AND TRADEMARK OFFICE
CERTIFICATE OF CORRECTION

PATENT NO. : 8,755,394 B2  Page 1 of 2
APPLICATION NO. : 13/102623
DATED : June 17, 2014
INVENTOR(S) : Kaluskar et al.

It is certified that error appears in the above-identified patent and that said Letters Patent is hereby corrected as shown below:

In the Specification:

In Column 1, Line 60, delete "network" and insert -- network. --, therefor.

In Column 2, Line 46, delete "an liquid" and insert -- a liquid --, therefor.

In Column 3, Line 51, delete "(UTMS)" and insert -- (UMTS) --, therefor.

In Column 5, Line 61, delete "etc)." and insert -- etc.). --, therefor.

In Column 7, Line 55, delete "(e,g," and insert -- (e.g., --, therefor.

In Column 10, Line 44, delete "UTMS" and insert -- UMTS --, therefor.

In the Claims:

In Column 14, Line 67, in Claim 1, delete "one the" and insert -- one of the --, therefor.

In Column 15, Line 50, in Claim 2, delete "wherein gateway" and insert -- .wherein the gateway --, therefor.

In Column 16, Line 30, in Claim 9, delete "command the" and insert -- command that --, therefor.

In Column 17, Line 56, in Claim 18, delete "device; and" and insert -- device; --, therefor.

In Column 17, Line 58, in Claim 18, delete "device; and" and insert -- device; --, therefor.

In Column 17, Line 60, in Claim 18, delete "traffic; and" and insert -- traffic; --, therefor.

Signed and Sealed this
Ninth Day of September, 2014

Michelle K. Lee
*Deputy Director of the United States Patent and Trademark Office*

CERTIFICATE OF CORRECTION (continued)
U.S. Pat. No. 8,755,394 B2

In Column 17, Line 62, in Claim 18, delete "time period" and insert -- time period; and --, therefor.

In Column 19, Lines 15-16, in Claim 26, delete "at least one of one of the at least" and insert -- at least one of the at least --, therefor.

In Column 20, Line 6, in Claim 28, delete "the one of one of the" and insert -- the one of the --, therefor.